(12) United States Patent
Parmigiani

(10) Patent No.: US 9,539,746 B2
(45) Date of Patent: Jan. 10, 2017

(54) COMPRESSION MOULDING THERMOPLASTIC MATERIAL

(75) Inventor: Corrado Saverio Parmigiani, Correggio (IT)

(73) Assignee: C.G.M. S.P.A., Correggio (Reggio Emilia) (IT)

( * ) Notice: Subject to any disclaimer, the term of this patent is extended or adjusted under 35 U.S.C. 154(b) by 686 days.

(21) Appl. No.: 13/978,933

(22) PCT Filed: Dec. 23, 2011

(86) PCT No.: PCT/IB2011/003174
§ 371 (c)(1),
(2), (4) Date: Jul. 10, 2013

(87) PCT Pub. No.: WO2012/095692
PCT Pub. Date: Jul. 19, 2012

(65) Prior Publication Data
US 2013/0285288 A1    Oct. 31, 2013

(30) Foreign Application Priority Data

Jan. 11, 2011 (IT) .............................. RE2011A0001

(51) Int. Cl.
| | |
|---|---|
| B29C 43/00 | (2006.01) |
| B29C 43/04 | (2006.01) |
| B29C 43/52 | (2006.01) |
| B29C 33/02 | (2006.01) |
| B29C 33/20 | (2006.01) |
| B29C 33/34 | (2006.01) |

(52) U.S. Cl.
CPC ............. *B29C 43/003* (2013.01); *B29C 43/04* (2013.01); *B29C 43/52* (2013.01); *B29C 33/02* (2013.01); *B29C 33/20* (2013.01); *B29C 33/34* (2013.01); *B29C 2043/046* (2013.01)

(58) Field of Classification Search
CPC .... B29C 2043/046; B29C 33/02; B29C 33/20; B29C 33/34; B29C 43/003; B29C 43/04; B29C 43/52
See application file for complete search history.

(56) References Cited

U.S. PATENT DOCUMENTS

| 5,139,407 A | 8/1992 | Kim et al. |
| 2002/0017742 A1 | 2/2002 | Kikuchi et al. |
| 2003/0051853 A1 | 3/2003 | Ikeda et al. |

*Primary Examiner* — Robert J Grun
(74) *Attorney, Agent, or Firm* — Volpe and Koenig, P.C.

(57) ABSTRACT

An apparatus includes one or more die groups which are movable independently of one another, each including a female part having a matrix cavity and a male part destined to penetrate into the cavity such as to define a forming chamber of the product, the cavity configured to contain a batch of material. The apparatus further includes a heating station having a heater to bring the plastic material to the fluid state, and a die group cooling station downstream of the heating station. The die groups are free to be cyclically inserted in the heating station and subsequently transferred to the cooling station. A thrust group is associated to a respective die group and is configured to provide a thrust for penetrating the male part into the cavity during the stage of forming the product, the thrust group being integral with the respective die-group in displacements during the operations performed.

10 Claims, 6 Drawing Sheets

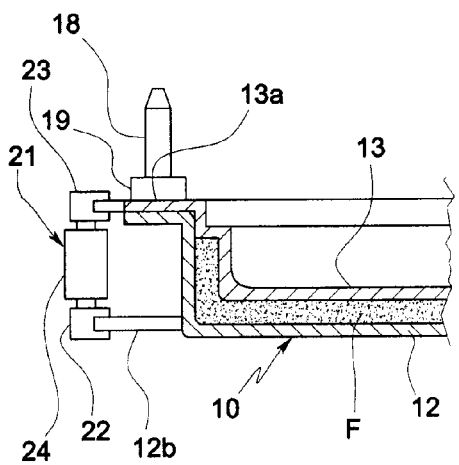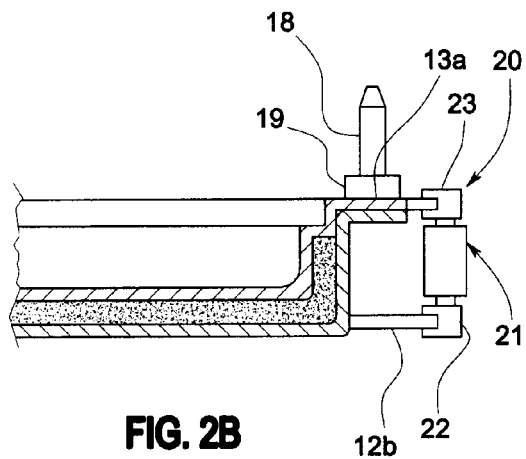
FIG. 2B
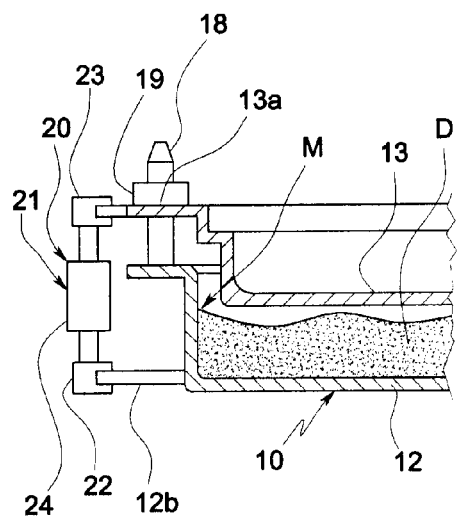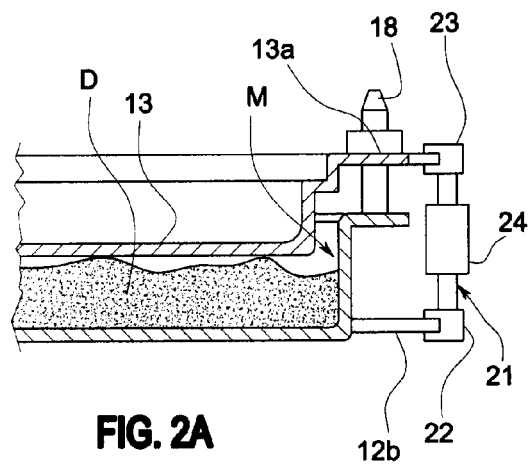
FIG. 2A

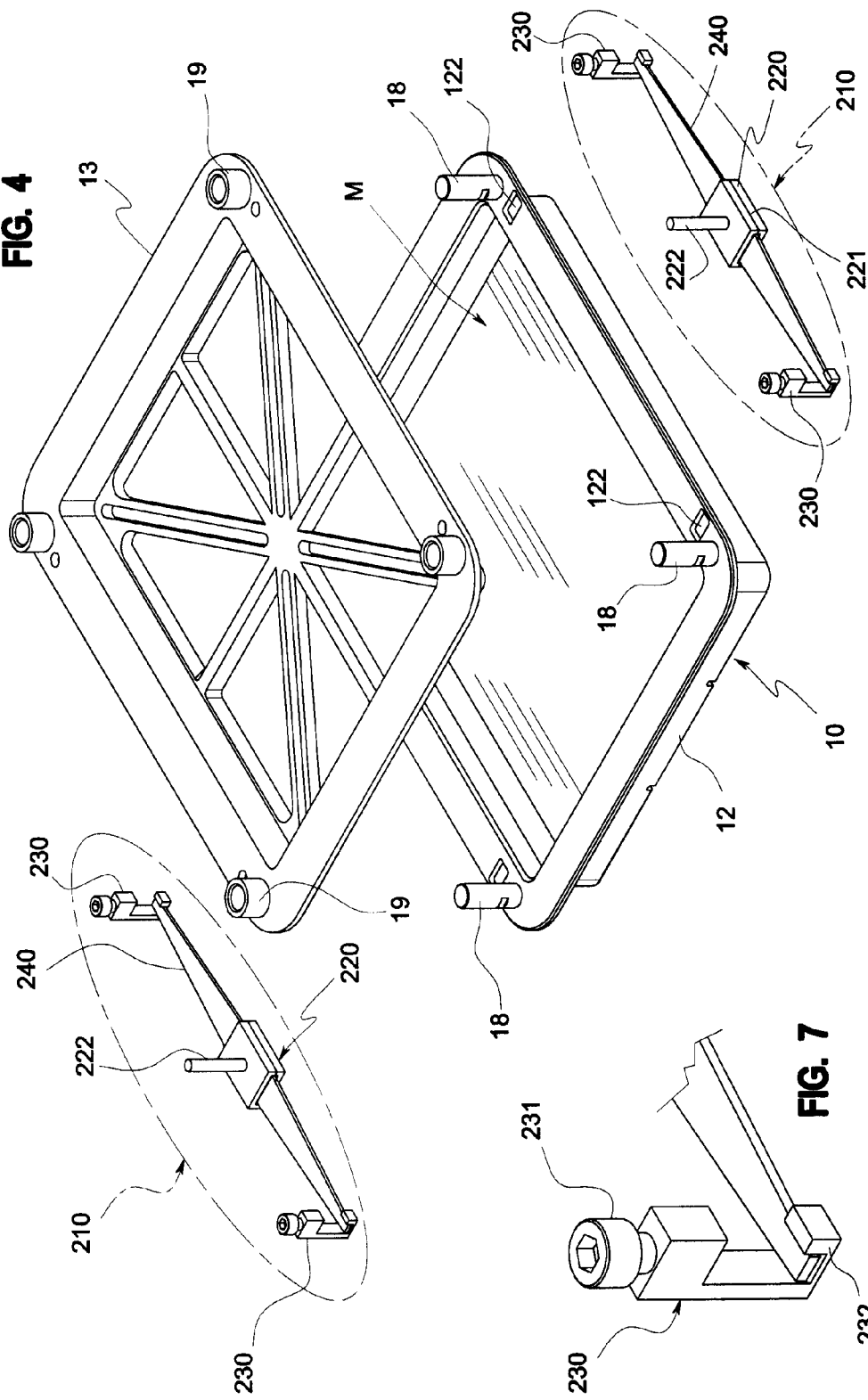
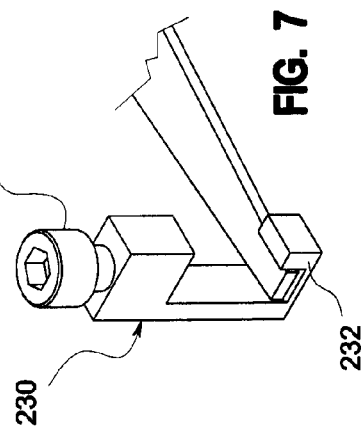

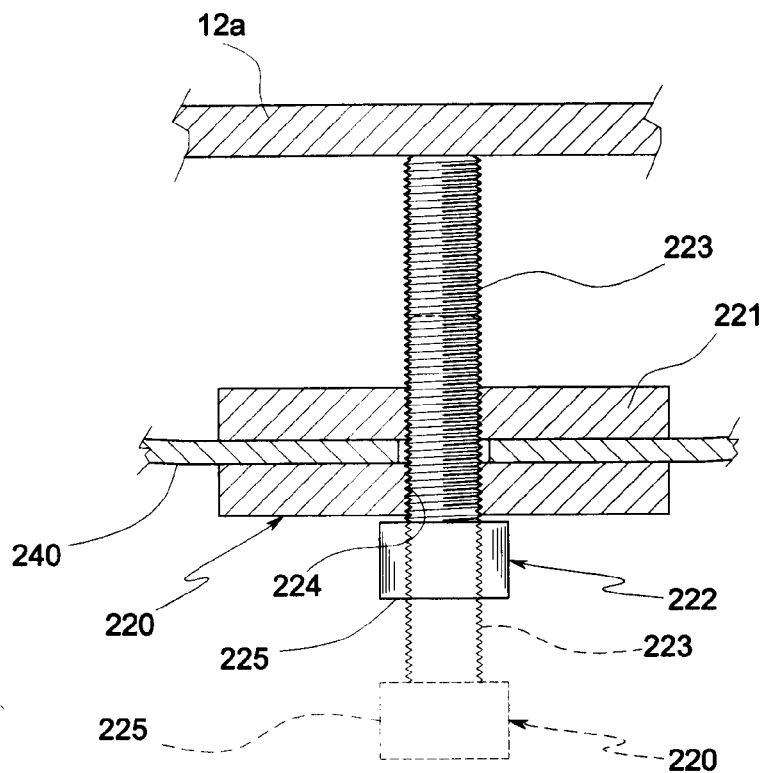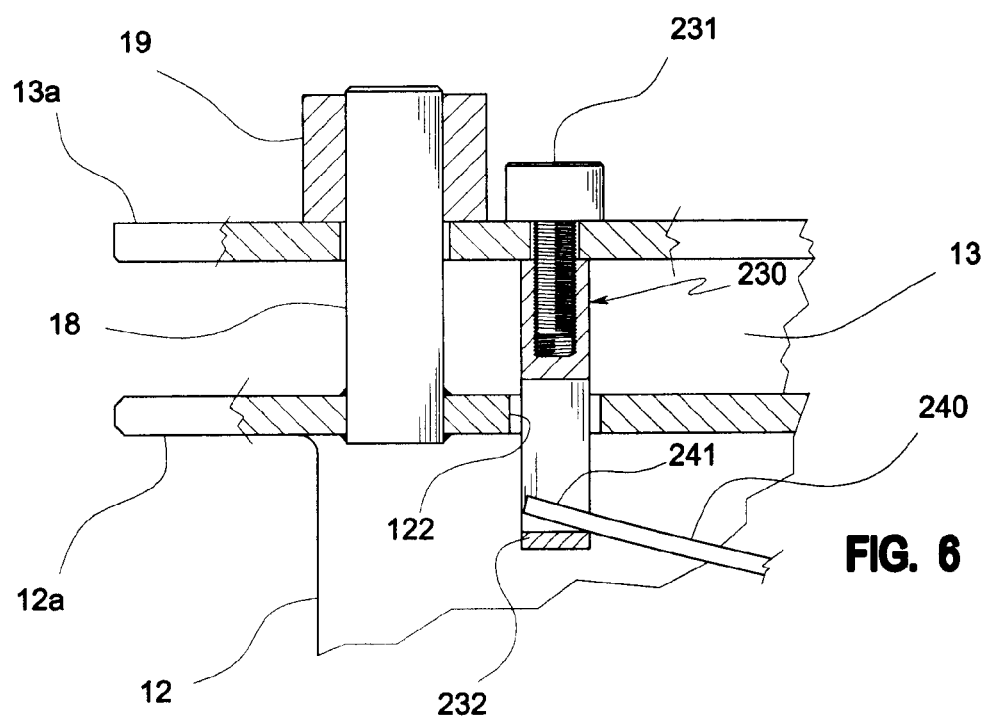

COMPRESSION MOULDING THERMOPLASTIC MATERIAL

TECHNICAL FIELD

The present invention relates to forming by compression of products using thermoplastic material, in which the material is subjected to compression in the fluid state and the forming is done by means of a die comprising a female part (matrix) having a matrix cavity and at least a male part (punch) which penetrates into the matrix cavity up to defining a forming chamber.

BACKGROUND ART

A traditional and consolidated technology for forming plastic products is injection moulding of thermopolymers; this is the typical technological method, in which material in the fluid, liquid or semi-liquid state is introduced to into a permanent mould (die), thrust by an injection force.

Injection moulding briefly comprises a plastification and injection group in which the polymer is melted, and a die having a chamber with fixed walls which gives shape to the product, into which the fluid polymer is injected.

As a crude base material the injection machine uses plastic granules which is are made to pass internally of a cylinder by means of an endless screw (Archimedes screw). The melting process internally of the cylinder is performed by means of heat induced by electrical resistances and by friction generated by the motion of the endless screw internally thereof.

The melting or softening temperature (vitreous transition) depends on the type of material which is to be used; it normally varies from 160 degrees Celsius for low density polyethylene (LDPE) up to 300 degrees Celsius for polycarbonate (PC).

The chamber of the die keeps the internal surfaces still, which the material in the fluid state is injected into the chamber up to filling it completely, thus defining the form to be obtained, and enables rapid cooling of the molten plastic and performs the expulsion of the solid finished product using special mechanical means known as extractors.

The injection pressure to which the die cavity is subjected is usually in the order of 300-600 Kg/cm$^2$. The dimensions of the die and the energy consumption thereof are strongly conditioned by the surface of the product to be moulded, and by the pressure applied during the injection stage, and are always relatively very high.

This technology is distinguished by its relatively very high costs for the dies and the injection machines.

Other known technologies are illustrated in United States publications US-A-2003 051853 and U.S. Pat. No. 5,193,407.

A different and more recent technology in which the present invention is applied comprises compression-forming of thermoplastic material products placed in the die matrix.

The compression penetration of the punch (male part) into the matrix chamber (female part) is performed after having inserted therein a batch of plastic material in the solid state (at ambient or pre-heated temperature), transformed into relatively small particles which make it sufficiently fluid, which batch is softened (possibly melted) internally of the die by contact thereof with the matrix and the punch, which are both heated by contact with two opposite heated plates (by electrical resistances), belonging to a press which compresses the plastic material placed in the matrix, with thrusts of relatively high entity, in the order of 50-100 kg/cm$^2$.

An example of this technology is described in US publication US 2002/0017742 A1, in which an apparatus is illustrated for compression forming of products realised using thermoplastic material, which comprises a plurality of die groups, mobile and movable independently of one another, each of which comprises a female part having a matrix cavity and a male part destined to penetrate the matrix cavity up to defining a forming chamber F of the product.

A pressing and heating station is provided, in which the die group, after having received a batch of material, is inserted between two heating plates of a press; the two plates heat the matrix and the punch of the die by conduction, while the matrix and the punch are subjected to a reciprocal nearing thrust which compresses the batch present in the matrix.

When the plastic material has reached the minimum desired viscosity (in which the material is fluid) and the punch has penetrated into the matrix as far as possible, the material completely fills the forming chamber, giving shape to the product. Then, the die group is freed by the press and transferred into a cooling station, located downstream of the heating station.

This station comprises a second press which provides the die group with a compression thrust equal to the one provided by the first press, and means which cool the die group while it is subjected to the thrust.

The die groups are free, mobile and movable independently of one another, and free to be cyclically inserted in the heating station and subsequently transferred to the cooling station.

A first type of drawback connected with this technology lies in the fact that in order to actuate a correct forming of the product internally of the die, it is necessary to keep the material internally of the mould subjected to a sufficient compression action continuously and constantly over the wholetime in which it is in a not sufficiently-solid fluid state, i.e. from the moment in which it became fluid up to the moment in which, by cooling, it reached a sufficiently solid and stable state.

On the contrary, the apparatus described in US 2002/0017742 after the step of compressing the fluid material in the pressing and heating station, when the die group is transferred into the cooling station, the material inside the die is freed by the action of the press, and the pressure acting on the material internally of the die is annulled.

A second type of drawback of this technology is that essentially the heating and softening (and therefore also the cooling) of the plastic material is done together with the compression of the material internally of the matrix on the part of the punch. This is necessary as it is the die group that is heated (and subsequently cooled) by the press and thus in turn heats, by conduction, the material it comes into contact with; thus for effective transmission of the heat there must be a good contact between the internal surfaces of the die group and the granules of plastic material and among the granules themselves, which contact is greater the greater the pressure exerted by these internal surfaces against the plastic material.

Here too, as with injection, the value of the pressures in play is still relatively high, in the order of 50-100 kg/cm$^2$, which requires equipment that is relatively sturdy and powerful.

Consequently, relevant technical drawbacks of this technology are connected to the heating and cooling of the dies, via which the material placed internally of the die is heated and cooled.

The relatively high compression thrust requires the parts of the die group to be sufficiently thick and sturdy, such as not to deform excessively, and thus female and male parts are required which have a relatively high mass; consequently high quantities of heat have to be transmitted thereto, proportional to the mass, with a consequent high consumption of calories and is proportionally long times for the transmission to take place.

During the cooling stage, relatively large quantities of heat have to be dissipated, which heat is therefore lost.

Finally, machinery is required (the presses) which is relatively powerful and therefore expensive, in order to be able to provide the necessary relatively high compression thrust.

In conclusion, the known compression moulding technology of thermoplastic material following penetration of the punc, into parts of heated dies, requires a relatively high consumption of energy, relatively long execution times and machines (presses) which are relatively powerful and therefore expensive.

Other limits of this application are the practical impossibility of heating the material to a point at which the whole mass thereof is in the liquid state, especially if the mass of the product is relatively high; in practice this technology is especially suitable for the use of expanded plastic in which softening is limited to the periphery of the particles of material without changing the physical state of the internal parts, thus obtaining products having cores that are not very compact, and are indeed non-uniform.

Consequently it is not practically possible to realise products in which a uniform and relatively large mass is required, such as technical articles having high functional quality or articles of high aesthetic quality.

DISCLOSURE OF INVENTION

A main aim of the present invention is to obviate the first type of drawback present in moulding technology by compression of thermoplastic material.

A further aim of the present invention is to obviate the above-described second type of drawback present in compression moulding technology of thermoplastic material, in relation both to the consumption of energy for heating and cooling die groups, and to plant costs.

A further aim is to broaden production possibilities, such as to make it practicable and economically advantageous to realise products having a uniform and compact mass even when the dimensions are relatively large (masses of greater than 10 kg).

This and other aims are attained by the invention as it is characterised in the claims.

The invention is based on the inventor's observation that it can be more advantageous to make use of die groups that are free, mobile and movable independently of one another It is also relevant that the male and female parts of the die group have very slim thicknesses which are sufficient only to resist relatively very small thrusts, with the aim of realising die groups having masses which are therefore very small. As the mass is relatively very small, low amounts of heat energy are required as well as short times for heating the die group and a therefore for melting the plastic material placed in the matrix. In practice it is possible to rapidly heat the thermoplastic material such that it reaches a degree of viscosity which is the same as or close to the minimum possible value for this type of material.

Thanks to this, it is at the same time possible to perform penetration of the male part into the matrix cavity with a penetration thrust which is relatively very small, because the plastic material to be displaced is very fluid; the penetration thrust required is just above the penetration thrust necessary for overcoming the mechanical friction present in the displacement of the male part with respect to the female part and to overcome the (small) hydrostatic thrust produced by an eventual increase in the level of the free surface of the fluid material.

Consequently, in order to support the relatively very small penetration thrust without relevant deformation, die parts can be used that have relatively small thicknesses, as has been observed.

The equipment of the invention comprises a plurality of thrust groups, each of which is associated to a respective die group and is destined to provide a thrust which is such as to produce penetration of the male part into the matrix cavity, in the forming of the product, and is mobile solidly with the die group in the displacements thereof during the operations performed in the heating and cooling stations and in the transfer from one station to another.

The die group and the respective thrust group define a unit which is is independent and free of external constraints, movable independently of the other die groups.

As the penetration thrust is relatively very small, it is possible to realise the thrust means in such a way that they have a relatively very small mass.

The invention enables economically advantageous realisation of products having a uniform and compact mass, even if they have relatively large dimensions (masses of above 10 kg).

Further, thanks to the relatively very small mass, it is possible to realise die groups that are relatively very light and therefore easily movable and manipulatable using mechanisation.

Consequently, the equipment required for realising the forming of the product can have relatively very low costs.

BRIEF DESCRIPTION OF DRAWINGS

The invention is described in detail in the following, with the aid of the accompanying figures of the drawings, which illustrate a non-exclusive embodiment thereof by way of example.

FIGS. 2A and 2B are schematic views of a section of the die group used by the apparatus, respectively in a configuration of start penetration and a configuration of complete penetration.

FIG. 4 is a perspective and exploded view of FIG. 3A.

FIG. 6 is an enlarged detail of FIG. 5B relating to a bracket 230.

FIG. 7 is an enlarged detail of FIG. 4 also relating to a bracket 230.

FIG. 8 is an enlarged detail of FIG. 58 relating to the rest element 220.

Figure 1:
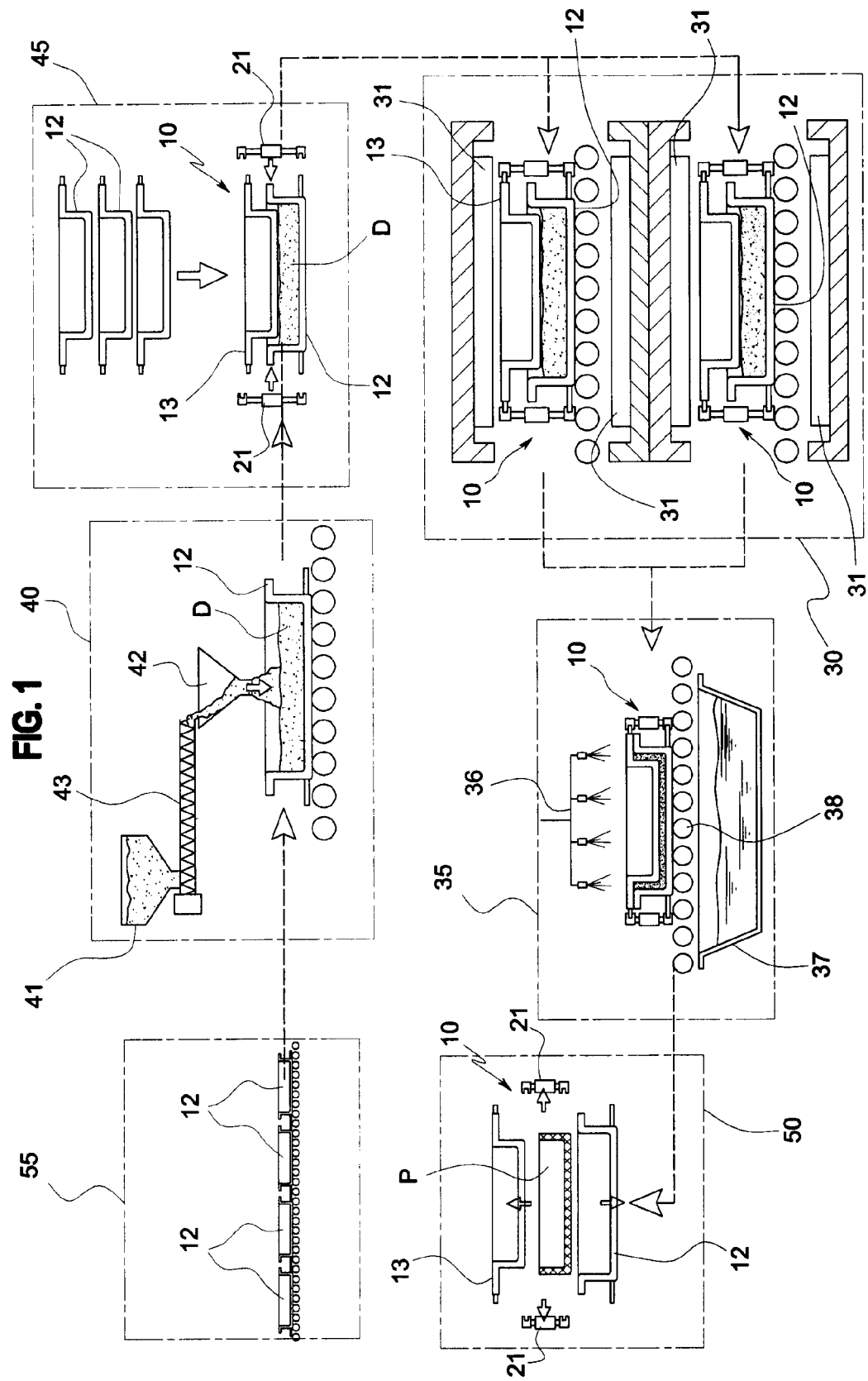
FIG. 1 is a schematic view of an embodiment of the apparatus of the invention.
Figure 3B:
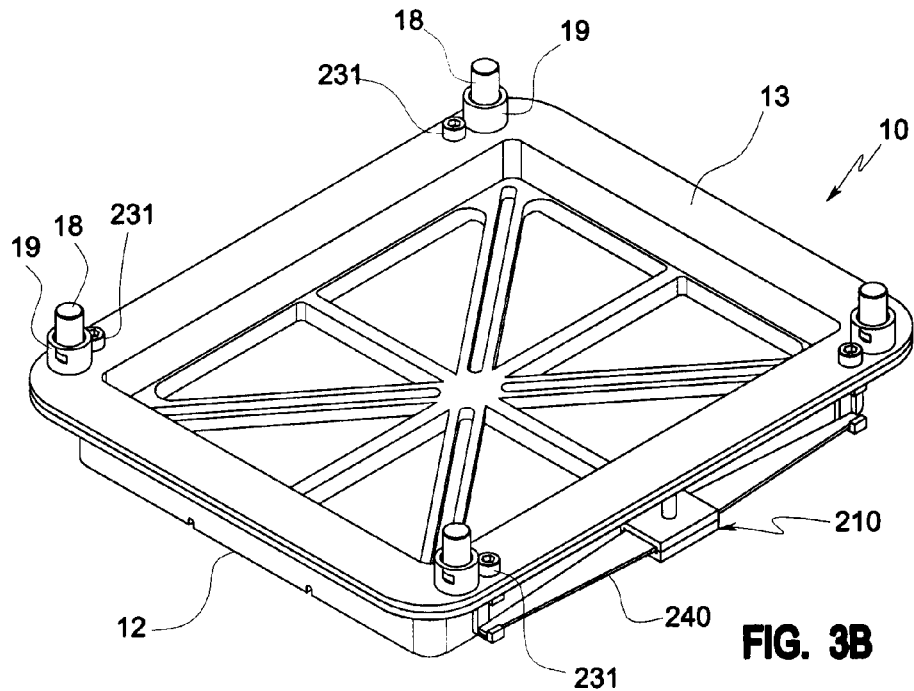
FIGS. 3A and 3*b* are perspective views of a second embodiment of the thrust group applied to the die group used by the apparatus, respectively in a start penetration configuration and a complete penetration configuration.
Figure 3A:
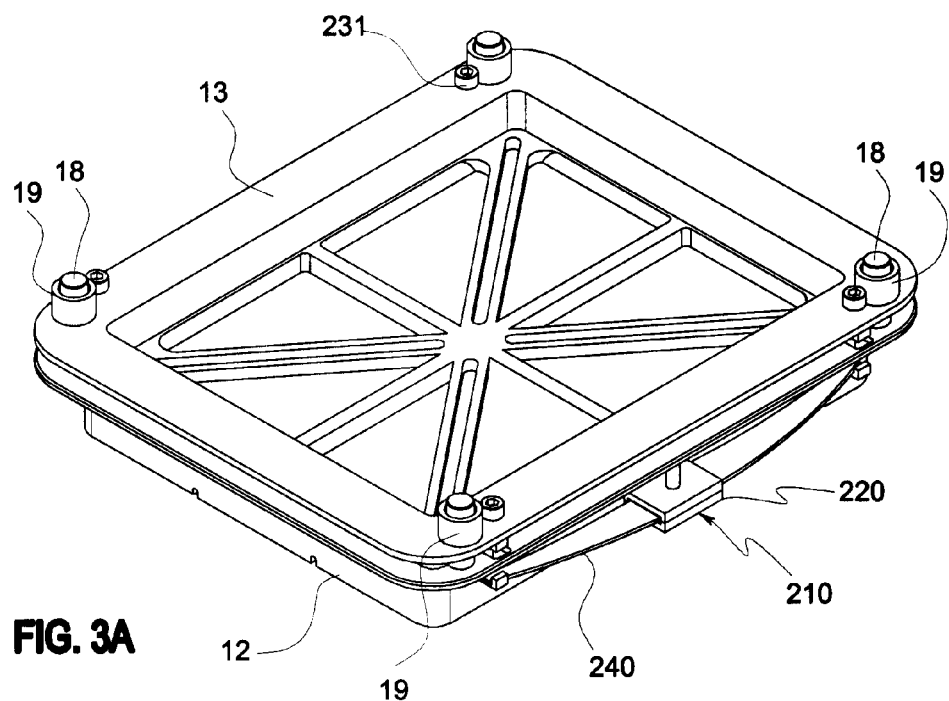

With reference to the figures of the drawings, the apparatus of the invention comprises a plurality of die groups 10, each of which (illustrated schematically in FIGS. 2A and 28)

comprises at least a female part 12, which exhibits a matrix cavity M and at least a male part 13, which is destined to penetrate into the matrix cavity M, defining there-with a forming chamber F which gives shape to the object.

The matrix cavity M of the female part is destined to contain a batch D of material for forming the product P.

The female and male parts of the die are operatively separable from one another, and are couplable to one another with relative movement in order to vary the degree of penetration of the male part 13 into the female part 12.

In order to perform the forming of the material loaded as a batch D in the cavity M, first the male part 13 is associated to the female part 12.

As a batch of material D is interposed internally of the cavity M, the male and female parts are at the maximum reciprocal distance: this is the start-forming configuration.

When the male part 13 penetrates into the female part 12 and reaches the maximum degree of penetration (which corresponds to the closing of the die), the forming chamber F reaches the shape and volume intended for the product P.

A plurality of thrust groups is comprised, each of which is associated to a respective die group 10, and is further destined to provide a thrust which is such as to produce penetration of the male part 13 into the matrix cavity M during forming of the product.

Further, the thrust group is mobile solidly with the die group 10 in the displacements the die group 10 makes in the heating and cooling stations and in the transfer from a station to another.

Each die group 10, with the respective thrust group, defines an independent unit that is free from external constraints and which is moved independently of the other die groups or by machines; in particular it is a unit that is neither constrained nor activated by presses or like machines. Its movement can be performed using any suitable transport means for objects, for example motorised carriage, transport lines etc.

In detail, in a preferred embodiment (though not exclusive) each thrust group comprises at least a thrust device 21 having a first constraining means 23 constrained to the male part 13 and a second constraining means 22 constrained to the female part 12, the two means 22 and 23 being subject to a reciprocal thrust such as to near the male part to the female part in order to cause the penetration of one inside the other.

In particular, the thrust device 21 comprises a preloaded elastic thrust means 24 acting on the male and female parts.

In a non-exclusive embodiment, illustrated in FIGS. 2A and 2B, each thrust group comprises two thrust devices 21, arranged on opposite lateral flanks of the die group 10, each of which comprises an elastic thrust means 24 (illustrated schematically in FIGS. 2A and 2B) which is connected to an upper head (which defines the means 23) destined to be connected to the male part 13, in particular to a perimeter edge 13a thereof, and to a lower head (which defines the means 22) destined to be connected to the female part 12, in particular lateral reliefs 12b thereof.

When the die group 10 is in the start-forming configuration (see FIG. 2A), the male and female parts being at the same reciprocal distance, the thrust means 24 generate a maximum thrust value which tends to penetrate the male part 13 into the female part 12.

When the male part 13 reaches the maximum degree of penetration (to which the closure of the die corresponds, see FIG. 2B), the penetration thrust on the part of the thrust means 24 maintains a value (minimum).

The thrust produced by the thrust group is permanent, i.e. it maintains a certain value (variable from a maximum to a minimum).

The thrust produced by the thrust group is such as to produce penetration of the male part 3 into the matrix M such as to define the forming chamber F of the product when the batch D is subjected to the heating stage.

Guide columns 18 are preferably comprised, projecting upwards, fixed with the lower end to the upper edge of the female part 12, which couple, with a is cylindrical coupling, to respective bushings 19 fixed to the upper edge of the male part 13; the function of the bushings 19 and the columns 18 is to guide the penetrating movement of the male part 13 into the female part 12 sufficiently precisely.

The die groups 10 are mobile and can be moved one at a time and by themselves and arranged anywhere, together with the thrust groups solidly associated thereto. In particular, they are free to be cyclically inserted in the heating station 30 and thereafter transferred therefrom to the cooling station 35.

The equipment further comprises (see FIG. 1) at least a heating station 30 having at least a heating means 31 destined to heat the die group 10 up to bringing the plastic material of the batch D contained therein into the fluid state.

The heating station 30 can use different energy sources; for example it can be a radiating furnace with infrared rays supplied with electrical energy, or a heating furnace using flames and combustion fumes supplied by gas or a further fuel, or an electric-induction heater; it must however be able to heat the die group 10 to temperatures which are such as to bring the plastic material of the batch D contained therein to the fluid state, preferably in the shortest possible time.

The described energy sources provide excellent heating for the plastic material of the batch D contained in the die group 10, as the external surface, facing upwards, of male part 13 and the external surface, facing downwards, of the female part 12 are mostly free from interposed bodies, as the thrust devices 21 are arranged on lateral flanks of the die group 10, and therefore leave the external surface free, preferably substantially completely; thanks to this aspect, it is possible to effectively transmit heat to the die group 10 by radiation, or by convection (hot fumes) or by electrical induction.

On the contrary, in the tradition method (for example the one described in US 2002/0017742 A1) the male part and the female part are reciprocally co-penetrated by means of a die which presses against and therefore covers the whole external surface of the male part, while a lower fixed base, being a reaction base, presses against the therefore covers the whole external surface of the female part. In this case heat has to be transmitted to the die, by heating the parts of the press which in turn heat the die parts by conduction.

In the case of heating means 31 by radiation, it is preferably advantageous to arrange a means 31 superiorly and a means 31 inferiorly to the die group in each furnace.

Preferably, in the case of heating means 31 by radiation, a means 31 is advantageously arranged in each oven superiorly, and another means 31 inferiorly of the die group.

Preferably, as illustrated in FIG. 1, several heating stations 30 are comprised in parallel, destined to operate on several die groups 10 contemporaneously.

The equipment of the invention further comprises at least a cooling station 35 destined to cool the die group, located downstream of the heating station.

For example the station 35 can advantageously comprise dispensing means 36 which spray and splash cooling water on the die group 10 which advances on a conveyor 38, originating from the heating station 30.

A collecting tray 37 for the water is located below, and the water is recycled.

The equipment further comprises a batching station 40, in which a batch D of material containing plastic material is loaded internally of each die group 10.

For example, the station 40 comprises a reservoir 41 containing large quantities of material, which is dispensed by means of a batching device 43 to a hopper 42 which pours the batch D into the cavity M, of a die group 10 moved by a conveyor 44.

During functioning, the following stages are performed.

In the initial stage, each die group 10 is treated in the batching station 40, where a batch D of material is loaded in the cavity M. The material which is used must be a thermoplastic material, to which a filler can be added, in particular an inert material; the thermoplastic material must be in a quantity that is such that any added material is bonded thereto in the final product.

The material is poured into the matrix cavity M of the female die group in the solid or semisolid state, in a granular form or in any case in sufficiently fine-grained form to be batched and dispensed sufficiently precisely; the size is preferably small such as to be able to control the batching in the cavity M sufficiently precisely.

The dispensing of the material into the cavity M is performed while the female part 12 is not closed by the male part 13.

In a second stage, the female part 12 containing the batch Q is brought into an assembly station 45 in which a respective male part 13 is associated thereto, and a respective thrust group is associated to the two parts 12, and 13, for example two thrust devices 21 which are applied to the two parts 12 and 13.

The die group is then placed in a pre-penetration configuration in which the male part 13 is penetrated into the cavity M only partially, up to abutting the batch D, which as it is in the solid state does not significantly change its shape and volume and prevents the male part 13 from penetrating up to the maximum degree in the cavity M; in this configuration, therefore, the degree of penetration is the minimum possible and the two parts 12 and 13 are at the maximum reciprocal distance though they are associated.

The two devices 21 provide, in this configuration, a permanent co-penetration thrust, in particular a maximum elastic preload, to which, as mentioned herein above, the high degree of non-deformability of the batch D is opposed.

In a following stage (third stage) the die group, loaded with a batch, is heated in a heating station 30 up to bringing the plastic material of the batch D contained therein to the fluid state, and the thrust supplied by the respective thrust group is contemporaneously applied thereto.

In particular, during this stage, the thermoplastic material is brought to a level of viscosity that is comprised between the minimum possible value and 9/10 of this value.

The heating of the thermoplastic material is done by conduction with the wall of the male and female parts being heated by the heating means 31, and by convection due to the heating of the air present among the granules; the air in its exiting movement from the cavity M contributes to heating the granules present.

The material injected can advantageously be pre-heated such as to accelerate this stage.

With the melting of the granules a fluid material is obtained which has a rheological behaviour that is similar to liquids and therefore uncompressible at low to medium pressures. For this reason it is not necessary to have a pressing stage of the die group 10, given that this does not give any benefit to the final physical characteristics of the plastic material.

The thrust supplied by the preloaded devices 21, which acts in the direction of the introduction of the male part 13 of the cavity M, compensates the reduction of the volume occupied by the solid granules following the change in state thereof and the evacuation of the air initially contained among the granules, up to obtaining, within the forming chamber F, a suitable volume for producing the object to be realised. In this stage the friction between the male part 13 and the female part 12, during the penetration of the former into the latter in the die-closing stage, must be overcome. This thrust contributes to the change in the internal velocity of the motion and the flows of the molten plastic material, modifying the time required for the forming process.

The thrust sufficient for penetration is relatively small, in the order of 0.05-0.2 kg/cm$^2$; this enables closing of the die by means of mass devices 21 which are relatively small and mobile with the die group, and means that it can be done without the use of the presses, which are usually large and expensive, as well as being fixed.

The preload system present during the heating and melting stage instantly compensates for the variations in volume of the plastic material, facilitating the evacuation of the air from the die.

The penetration ends on reaching a predetermined end-run during the stage of closing the die; at that point the material has completely filled the forming chamber F which is in the final configuration, corresponding to the form to be given to the product.

In a following stage the die group, together with the respective thrust group, is transferred from the heating station to a coaling station 35 destined to cool the die group, such as to enable extraction of the product P.

In the station 35, the die group is cooled, the thrust provided by the respective thrust group being applied thereto.

The die group is cooled with cooling water (or another substance) issued from the dispensing means 36, and the material placed in the forming chamber F is also cooled and returned to the solid state (or practically solid). Starting from the beginning of the heating stage of the die group 10 (in the heating station 30), up to the end of the following cooling stage of the die group 10 (in the cooling station 35), comprising the times for transfer from one station and another, the die group 10 remains subject to the thrust provided by the respective thrust group. Therefore during the cooling stage the product remains under pressure and this aspect facilitates excellent passage from the more molten state to the solid state of the product internally of the die group 10, with optimal results for the quality of the final product which is obtained.

Thereafter, in a further station (demounting) 50 the die group is deassembled and the product P is extracted from the forming chamber F in order to be sent to the following treatment.

The female parts 12 are sent to a collecting station 55, from which they are returned to the cycle by being sent to the batching station 40; the male parts 13 are instead collected at the assembly station 45 in which they are newly associated to a respective female part 12 loaded with a batch D.

The second embodiment of the thrust group, illustrated in FIGS. 3A, 36, 4, 5A, 5B, 5C, 6-8 differs from the preceding one in the conformation of the two thrust devices (denoted herein by 210), arranged (in this case too) on two opposite lateral flanks of the die group 10.

Each device 210 comprises an elastic thrust means 240 connected to two first means 230, constrained to the male part, and connected to a second means 220, constrained to the female part, the two constraining means 220, 230 being subjected to a thrust produced by the thrust means 240 such as to cause penetration of the male part into the female part during the forming stage.

The elastic thrust means 240 is defined by an elongate laminar plate made of a material having good elastic flexibility properties, for example a flexible elastic steel.

The two ends 241 of the thrust means 240 are solidly constrained to the male part 13 by means of two respective brackets (which define the constraining means 230), while the central part of the thrust means 240 is fixed to a rest element (which defines the constraining means 220) which forms a constraint with the female part 12.

Each bracket 230 is fixed, with the upper end thereof, to the lower surface of the perimeter edge 13a of the male part 13, by means of a bolt 231, and vertically projects downwards, passing through a hole 122 afforded in the edge 12a of the female part 12, up to projecting downwards beyond the edge 12a (see in particular FIG. 6).

The lower end portion of the bracket 230 exhibits a hook 232 located inferiorly of the edge 12a, which defines a horizontal seating destined to restingly receive the end 241 of the thrust means 240.

The rest element 220 (see in particular FIG. 8) comprises a central body 211, which constrains the median zone of the thrust means 240; the body 221 is formed by two plates, an upper and a lower plate, which stackingly close the thrust means 240, these being three bodies in reciprocal contact.

The rest element 220 further comprises a screw 222 having a stalk 223 and a head 225; the stalk 223 is threaded and engages through a threaded through-hole 224 afforded in the central body 221; the stalk 223 projects outwardly upwardly with respect to the central body 221 and the upper end thereof rests thrustingly against the lower surface of the edge 13a.

The thrust means 240 afforded a through-hole, coaxial with the hole 224, through which the stalk passes freely 223.

In use, when the male and female parts of the die are not associated, the thrust means 240, together with the rest element 220, is also separated from the two die parts; the brackets 230 remain fixed to the respective male parts. After the male part 123 has been associated to the female part 13 containing the batch D, a respective thrust group is applied to the male and female parts of the die (12 and 13), i.e. the two thrust devices 210 are constrained to both the parts 12 and 13.

To this purpose the following is performed.

First, the two ends 241 of the thrust means 240 are rested on the seatings of the hooks 232, which project downwardly beyond the edge 12a of the female part 12 (see FIG. 5a); at the same time, the upper end of the stalk 223 is placed in contact with the lower surface of the edge 12a; during this stage the stalk 223 projects upwardly beyond the central body 221 only by a brief tract (as also illustrated in FIG. 8 in a broken line).

During this stage the thrust means 240 is only slightly or not at all flexion-loaded and the reciprocal thrust between the two die parts is almost zero.

Figure 5A:
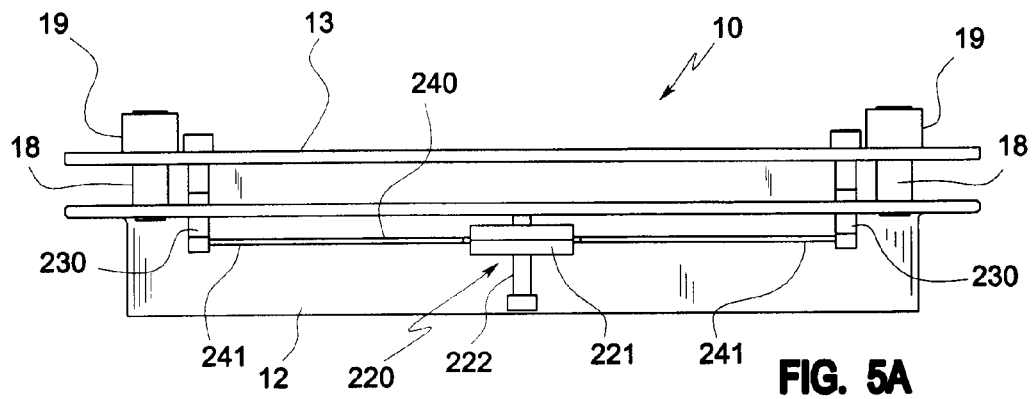
FIG. 5A is a lateral view of the die group in an application stage of the thrust group.
Figure 5B:
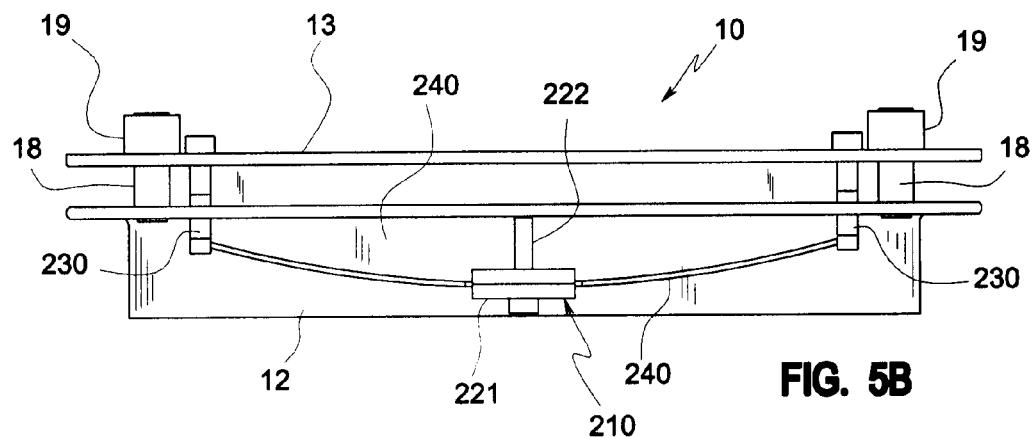
FIGS. 5B and 5C are lateral views of the die group with the thrust group of FIG. 3A and respectively of FIG. 3B.
Figure 5C:
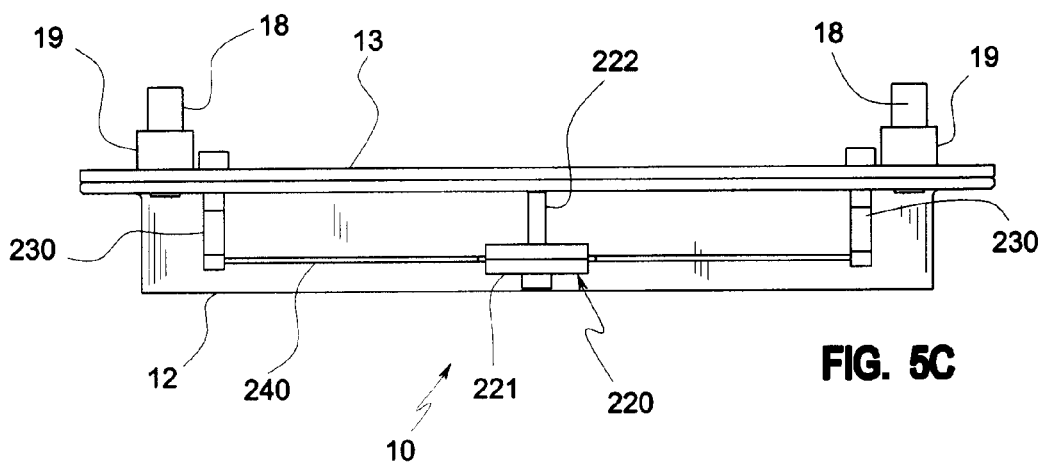

In order to load the thrust means 240 the screw is turned 222 (by acting on the head in such a way that thanks to the helical coupling between the stalk 223 and the threaded hole 224 the length of the portion of stalk 223 which projects superiorly of the central body 221 is increased, such as to flex-deform the thrust means, as the central part thereof, being trapped by the central body 221, is distanced from the edge 12a of the female part, while the ends thereof 241, constrained by the brackets 230, keep their position with respect to the edge 12a (see FIG. 5B). The flexion of the thrust means 240 is realised to an appropriate amount such that it is loaded to the right amount to supply by reaction the desired thrust between the male part, constrained to the brackets 230 in turn constrained to the ends of the thrust means 240 and the female part restingly constrained against the rest element 220 in turn constrained to the median part of the thrust means 240.

This thrust is such as to near the parts of the die to one another such as to produce penetration of the male part 13 into the matrix M cavity in order to form the product.

To disassociate the thrust devices 210 from the parts of the die, the above procedure is repeated in inverse order.

The invention claimed is:

1. An apparatus for compression forming of products comprised of a material comprising thermoplastic material, the apparatus comprising:
  one or more die groups (10) which are free, mobile and movable independently of one another, each of which comprises:
    a female part (12) having a matrix cavity (M) and a male part (13) destined to penetrate into the matrix cavity (M) such as to define a forming chamber (F) of the product, the matrix cavity (M) of the female part being configured to contain a batch of material;
  at least a heating station (30) having at least a heater destined to heat the die group (10) up to bringing the plastic material contained therein to the fluid state,
  at least a cooling station (35) configured to cool the die group (10) located downstream of the heating station,
  the die groups (10) being mobile and free to be cyclically inserted in the heating station and subsequently transferred therefrom to the cooling station, the die groups comprising thrust groups, each of which is associated to a respective die group (10) and is configured to provide a thrust for penetrating the male part (13) into the matrix cavity (M) during the stage of forming the product, the thrust group being integrally mobile with the respective die-group (10) in displacements thereof during the operations performed in the heating and cooling stations and during transfer from a station to another, wherein each thrust group comprises at least a thrust device (21, 210) having at least a thruster (24, 240) constrained to the male part and to the female part, the thruster (24, 240) providing a thrust which is such as to actuate penetration of the male part into the female part.

2. The apparatus of claim 1, wherein the thrust device (21, 210) comprises an elastic thruster (24, 240) which acts, in a preloaded way, on the male and female parts.

3. The apparatus of claim 1, wherein each thrust group comprises at least two thrust devices (21, 210) arranged on lateral flanks of the die group (10).

4. The apparatus of claim 1, wherein each thrust device (21, 210) comprises an elastic thruster (24, 240) which is configured to be connected to the male part (13) and the female part (12).

5. The apparatus of claim 1, wherein the thruster (240) is defined by an elongate plate having elastic flexibility properties, two ends (241) of which are solidly constrained to the male part (13) by means of two respective brackets (230), while the central part of the thruster (240) is fixed to a rest element (220) which forms a constraint with the female part (12).

6. The apparatus of claim 5, wherein the rest element (220) comprises:
- a central body (221) which constrains the median zone of the thruster (240);
- a screw (222) having a threaded stalk (223) which engages through a threaded through-hole (224) of the central body (221), and the stalk (223) projects outwardly upwardly with respect to the central body (221) and the upper end thereof rests thrustingly against the lower surface of the edge (13*a*).

7. The apparatus of claim 1, wherein the die group (10) together with the respective thrust group define an independent unit which is free of external constraints and is movable independently of the other die groups together with the respective thrust groups.

8. The apparatus of claim 1, wherein the male part and the female part of the die group (10) have substantially slim thicknesses, sufficient only to resist relatively very small thrusts.

9. A method for compression-forming of products comprised of a material comprising thermoplastic material, the method comprising:
- providing one or more the groups (10), each of which comprises:
  - a female part (12) having a matrix cavity (M) and a male part (13) destined to penetrate into the matrix cavity (M) such as to define a forming chamber (F) of the product, the matrix cavity (M) of the female part being destined to contain a batch of material;
- loading a batch of material into the cavity (M) of each the group (10);
- applying to each the group (10) a respective thrust group destined to provide a penetrating thrust of the male part (13) into the matrix cavity (M) during forming of the product, the thrust group being mobile solidly with the respective die group (10) in displacements that the die group (10) undergoes during the operations performed in the heating and cooling stations and in the transfer from a station to another;
- heating the die group (10), loaded with a batch, in a heating station, up to bringing the plastic material contained therein to the fluid state, the thrust applied thereto being provided by the respective thrust group,
- transferring the die group (10) together with the respective thrust group from the heating station to a cooling station destined to cool the die group (10), and
- cooling the die group (10) in the cooling station, the thrust applied thereto being provided by the respective thrust group, wherein each thrust group comprises at least a thrust device (21, 210) having at least a thruster (24, 240) constrained to the male part and to the female part, the thruster (24, 240) providing a thrust which is such as to actuate penetration of the male part into the female part.

10. The method of claim 9, further comprising:
- bringing the thermoplastic material, during the heating stage, to a level of viscosity comprised between a minimum possible value and $9/10$ of the minimum possible value.

* * * * *

UNITED STATES PATENT AND TRADEMARK OFFICE
CERTIFICATE OF CORRECTION

PATENT NO. : 9,539,746 B2  
APPLICATION NO. : 13/978933  
DATED : January 10, 2017  
INVENTOR(S) : Corrado Saverio Parmigiani Page 1 of 1

It is certified that error appears in the above-identified patent and that said Letters Patent is hereby corrected as shown below:

In the Claims

In Claim 9, Column 11, Line 26 after the words "providing one or more" delete "the" and insert therefore --die--.

In Claim 9, Column 12, Line 1 after the words "the cavity (M) of each" delete "the" and insert therefore --die--.

In Claim 9, Column 12, Line 3 after the words "applying to each" delete "the" and insert therefore --die--.

Signed and Sealed this  
Seventh Day of March, 2017

Michelle K. Lee  
*Director of the United States Patent and Trademark Office*